(No Model.)
J. KORNBLUM, J. A. BRASHEAR & P. PAINTER.
ASTIGMATIC EYE PIECE FOR OPTICAL INSTRUMENTS.
No. 408,725. Patented Aug. 13, 1889.
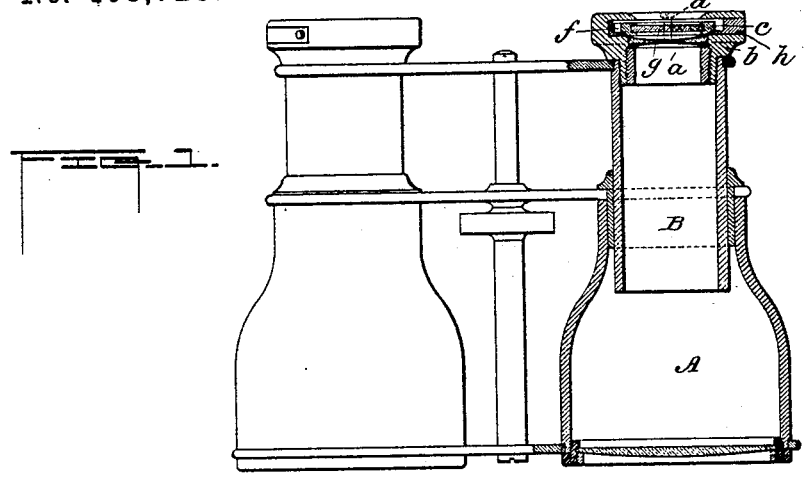
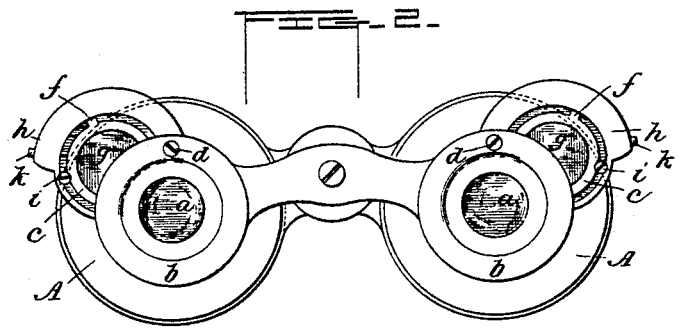
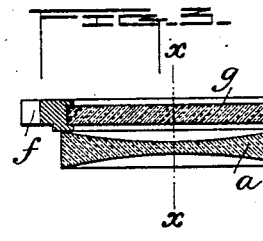
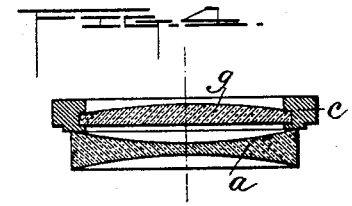
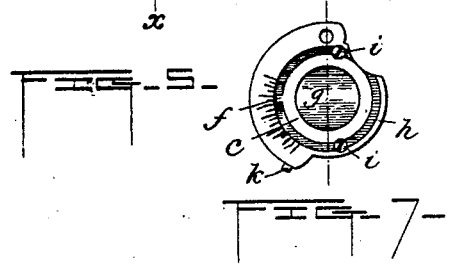
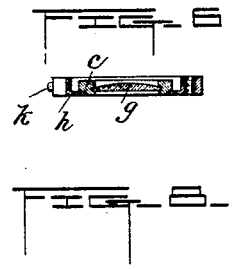
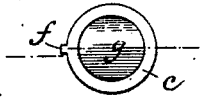
Witnesses
N. B. Corwin
J. K. Smith
Inventors
Joseph Kornblum
John A. Brashear
Parr Painter
by W. Bakewell & Sons, their Attorneys.

UNITED STATES PATENT OFFICE.

JOSEPH KORNBLUM, JOHN A. BRASHEAR, AND PARK PAINTER, OF ALLEGHENY, PENNSYLVANIA.

ASTIGMATIC EYE-PIECE FOR OPTICAL INSTRUMENTS.

SPECIFICATION forming part of Letters Patent No. 408,725, dated August 13, 1889.

Application filed March 8, 1889. Serial No. 302,474. (No model.)

*To all whom it may concern:*

Be it known that we, JOSEPH KORNBLUM, JOHN A. BRASHEAR, and PARK PAINTER, of the city of Allegheny, in the county of Allegheny and State of Pennsylvania, have invented a new and useful Improvement in Astigmatic Eye-Pieces for Optical Instruments, of which the following is a full, clear, and exact description.

Our invention is designed to correct in the use of optical instruments the defect known as "astigmatism," caused by difference of refraction of the horizontal and vertical meridians of the observer's eye, and which more or less completely prevents the efficient use of such instruments, as ordinarily constructed, by persons whose eyes (one or both) have an abnormal difference of curvature of the two meridians of the cornea of the same eye.

Our improvement may be applied to telescopes, microscopes, lorgnettes, opera-glasses, field-glasses, levels, and similar instruments; but for convenience we describe it in the specification as applied to an opera-glass.

Our improvement consists in the application to the eye-piece or upper lens of an opera-glass or similar instruments of a secondary lens placed inside of the tube of the instrument, the character of the secondary lens being such as to correct the effects of the astigmatism of either or both of the human eyes in the use of such instruments.

Our improvement further consists in the construction and arrangement of the parts so that the astigmatic correcting-lens may be readily adjusted by the user to suit the peculiar character of his eye or eyes, and so that in a binocular instrument—such as an opera-glass or lorgnette—the astigmatic correcting attachment may be thrown out of use on either or both sides of the instrument, so that it may be equally adapted to use by a person whose eyes are normal, or by a person one only of whose eyes is affected with astigmatism.

The secondary lens which we use, instead of being of the ordinary shapes—such as double-convex or double-concave, or plano-convex or plano-concave—has parallel faces in a section in one direction, and plano-convex shape in a section at right angles to the first plane of section, or, in other words, it is a segment of a cylinder. This lens is made of circular shape and of any desired diameter to suit the instrument, being usually of about the same diameter as that of the primary lens or eyeglass of the instrument.

In cases where the astigmatism of one or both eyes is merely an abnormal difference of curvature of the cornea in the two meridians of the eye (the meridians being at right angles to each other) the problem of constructing an instrument to cure the defect would be comparatively simple; but as astigmatism of the human eyes is very frequently not of the regular type, the greatest difference of curvature of the cornea occurring in planes which are not at right angles to each other, it becomes necessary to a really practical and useful instrument that the line of parallel faces of the secondary lens should be adjustable to any desired angle to the vertical line of the primary lens, and this is very important in a binocular instrument to accommodate cases of different angles of astigmatism in the two eyes of the observer. In order to permit of such adjustment by the user, we have devised a construction of the eye-piece of the instrument, such that the astigmatic or secondary lens, either in an instrument to be used with one eye or with two eyes, may be readily adjusted to any degree of astigmatism In the accompanying drawings, Figure 1 illustrates our invention as applied to a binocular opera-glass or lorgnette, one-half of the instrument being shown in section. Fig. 2 is a plan view of the instrument viewed from the eye-piece end, showing the secondary or astigmatic lens turned out from the range of vision. Fig. 3 is an enlarged sectional view of the primary and secondary eye-pieces or lenses. Fig. 4 is an enlarged sectional view of the lenses shown in Fig. 3 on the line $x\,x$ of that figure. Fig. 5 is a plan view, and Fig. 6 a sectional view, of the movable secondary-lens holder with the adjustable secondary-lens frame and lens in place. Fig. 7 is a plan view, and Fig. 8 a section, of the secondary lens and its frame detached from the lens-holder and from the instrument.

In the several figures like letters indicate similar parts of the apparatus.

In Fig. 1 the half of the opera-glass shown in section illustrates our invention. The construction of the instrument is similar to that ordinarily in use, with the exception of the addition to each half of the instrument of the movable secondary-lens holder $h$ for carrying the astigmatic lens, and the construction and arrangement of the device for permitting of the axial adjustment of that lens.

A is the main tube, at the lower end of which is the object-glass.

B is the extension-tube, so arranged, as usual, as to be extended out of or drawn into the main tube for compactness and for adjustment of the focus. These parts need no particular description. The primary lens or eye-piece $a$ is inserted in a suitable circular cavity in the upper part of the extension-piece B below the screw-cap $b$. To the screw-cap $b$, so as to be immediately above the primary lens when the parts are in place, is attached a movable lens-holder $h$ by a pivot $d$, so that the lens-holder may be turned so as to bring the secondary lens in the line of sight, or may be turned out, as shown in Fig. 2, so as to be out of the range of vision. A pin or stud $k$ on the periphery of the secondary-lens holder $h$ enables the finger of the user to engage it and turn it out when desired. The lens-holder $h$ is substantially an annulus, as shown in Fig. 5, having a recess around its circular inner edge to receive the frame $c$, carrying the secondary or astigmatic eye-piece $g$, which is kept in place by a couple of small screws $i\,i$, (see Fig. 5,) the heads of these screws overlapping the outer edge of the light annular frame $c$, in which the astigmatic lens is set, so as to hold it in its seat without interfering with its rotation on its axis. A pin or stud $f$ projects from the periphery of the frame $c$, by means of which the astigmatic lens is turned so as to adjust its position relatively to the perpendicular line of instrument when used.

In the drawings we have shown the auxiliary lens as semi-cylindrical on one face and plane on the other face, as we consider it better, especially in an opera-glass, to employ a lens whose action is negative. In fact, it will always be preferable to have no magnification in the auxiliary lens. We have also shown the auxiliary lens mounted with the cylindrical face outside or next to the eye and the plane side to the eyeglass; but this relative position may be reversed.

If desired, one surface of the annulus $h$, constituting the movable auxiliary-lens holder, may be graduated more or less minutely, as in Fig. 5, and then by having an index on the frame $c$ of the auxiliary lens the stud $f$ may serve as such index. The degree of astigmatism of the user may be ascertained by adjusting the auxiliary lens, and the angle being once ascertained it may thereafter be set without experimenting on the adjustment.

When used for opera-glasses, in order not to reduce the field the auxiliary or cylindrical lens may be of the negative or concave form, because the question of magnification should not be made to depend on the auxiliary lens, but entirely on the concave eyeglass and the focusing-screw; but when used in telescopes or field-glasses either a positive or negative cylindrical lens may be used in the same way; but in case of using a positive (convex) cylindrical auxiliary lens it should be mounted quite close to the eye-lens, in order that the best results may be obtained. The auxiliary lens should, we think, be preferably made of light crown-glass, and if used as astigmatic connections for telescopes should be polished with paper or pitch instead of felt, at least where high powers are used, which is often necessary in observations on stars and other celestial phenomena.

By the use of the term "semi-cylindrical" in the specification and claims as applied to the secondary eye-piece or lens we do not desire to be understood that the section of the glass cylinder from which the astigmatic lens is formed is in the line of the axis of the cylinder, so as to give a lens which shall be actually half a cylinder, but merely that one side of the lens is a plane surface, or may be so, and the other side curved, as hereinbefore described.

Having thus described our invention, what we claim, and desire to secure by Letters Patent, is—

1. The combination, with the eye-piece or ordinary primary lens of optical instruments—such as telescopes, opera-glasses, &c— of a semi-cylindrical secondary lens capable of rotation on its axis within the secondary-lens holder, substantially as and for the purposes described.

2. The combination, with the eye-piece or ordinary primary lens of a telescope, opera-glass, or similar optical instrument, of a secondary lens or eyeglass, of semi-cylindrical shape, set in a frame or secondary-lens holder so as to be rotatable on its axis therein, such secondary-lens holder being pivoted to the instrument to permit of the secondary lens being turned in or out of the line of vision, substantially as described.

3. In a binocular telescope, lorgnette, or opera-glass, the combination, with the ordinary object-glass and eyeglass at each end of the instrument, of a semi-cylindrical lens set near to and substantially parallel with the eyeglass and set in a circular frame capable of rotation on its axis in an annular frame or auxiliary-lens holder, which is pivoted to the frame of the instrument so as to be readily turned into or out of the line of vision of the instrument, as and for the purposes described.

4. In combination with the eye and object glasses of a telescope or similar optical instrument and the frame carrying the same, an annular lens-holder for carrying a secondary astigmatic lens, within which frame said lens is capable of being turned on its axis, and a graduated scale for indicating the angle of astigmatism when the primary and secondary lenses are adjusted in use, substantially as described.

In testimony whereof we have hereunto set our hands this 12th day of February, A. D. 1889.

JOSEPH KORNBLUM.
JNO. A. BRASHEAR.
PARK PAINTER.

Witnesses:
HILARY B. BRUNOT,
J. K. SMITH.